2,961,450
United States Patent Office
Patented Nov. 22, 1960

2,961,450
HYDROLYSIS OF STEROID SEMICARBAZONES

Thomas Eric Holt, Bushey Heath, and John Attenburrow, West Harrow, England, assignors to Glaxo Laboratories Limited, Greenford, Middlesex, England, a British company No Drawing. Filed Nov. 10, 1958, Ser. No. 772,680

Claims priority, application Great Britain Nov. 14, 1957

13 Claims. (Cl. 260—397.45)

This invention is concerned with improvements in or relating to the preparation of steroid compounds.

In reactions involving steroids containing one or more keto groups it is sometimes necessary or advisable to protect the keto groups from attack during the modification of a further part of the steroid molecule. A convenient method of protection is to react the steroid with semicarbazide to form the corresponding semicarbazone compound. Whilst the keto groups are thus protected, one can often carry out the particular modification desired, such as for example the reduction of a keto group inactive to treatment with semicarbazide, and thereafter hydrolyse the resultant semicarbazone to restore the keto group or groups.

Thus, for example, in the synthesis of prednisolone, one may use as intermediate 4:5α-dihydrocortisol acetate, which may in turn be prepared from 4:5α-dihydrocortisone 21- acetate by conversion to the corresponding 3:20-bis-semicarbazone, reducing the 11-keto group to an 11β-hydroxy group and then hydrolysing the semicarbazone linkages to form 4:5-dihydrocortisol. In like manner, one may convert cortisone 21-acetate to cortisol.

It is an object of the present invention to provide an improved procedure for the acid hydrolysis of semicarbazone derivatives of keto steroids.

It has now been found that the acid hydrolysis of semicarbazone derivatives of steroids is especially conveniently effected in a homogeneous medium consisting of aqueous tetrahydrofuran and that the resulting keto steroid can be simply recovered by causing the medium to form two phases, namely an aqueous phase and a tetrahydrofuran phase, the keto steroid being largely obtained from the organic phase. Further keto steroid can be obtained by re-extracting the residual aqueous phase with tetrahydrofuran. The separation of the homogeneous reaction medium into two phases may be simply effected by adding a salt thereto.

The principal advantage of this procedure is that one is able to use the tetrahydrofuran not only to form part of the actual reaction mixture but also as the extraction solvent. This obviates the use of a separate and distinct extraction stage perhaps with a different solvent, the extraction being simply conducted by mere addition of a salt to the reaction mixture. Tetrahydrofuran is also a very good solvent for steroids and its use as herein proposed enables its favourable properties to be used to good advantage. Furthermore, the technique of protection of keto groups by semicarbazone formation is often used when reactive keto groups are to be protected during reduction of other keto groups by borohydrides; such reductions are very conveniently conducted in tetrahydrofuran with the result that by the present process one is able to conduct such reductions, hydrolysis of the resultant semicarbazone and extraction in an extremely convenient manner.

According to the invention, therefore, there is provided a process for the acid hydrolysis of semicarbazone linkages in steroids in which the hydrolysis is carried out in solution in a homogeneous medium consisting essentially of aqueous tetrahydrofuran, the resulting keto steroid being recovered by causing the medium to separate into two phases, separating off the organic phase and recovering the keto steroid therefrom.

The homogeneous medium is conveniently formed by adding an aqueous solution of the hydrolysing acid to tetrahydrofuran or by adding acid to the aqueous tetrahydrofuran solution of the semicarbazone obtained from a previous step such as reduction. Sufficient tetrahydrofuran should be present in the medium to ensure complete solution of the steroid semicarbazone and reaction product. Suitable acids for the hydrolysis include, particularly, strong mineral acids, e.g. hydrochloric acid, phosphoric acid or sulphuric acid.

The process according to the invention is particularly of value in the hydrolysis of semicarbazones of 20-keto pregnane and allopregnane compounds, which compounds include in particular the 3:20-bis-semicarbazones of prednisolone, cortisol, 4:5α-dihydrocortisol and 4:5β-dihydrocortisol and the 21-acylates, e.g. acetates, thereof.

In the applicaion of the present invention to the hydrolysis of a semicarbazone of a 20-keto pregnane or allopregnane compound, also possessing a 17-hydroxy group, particularly to the above cited members of the series, much improved results have been found to be obtained by the use of sulphuric acid in place of the previously proposed hydrochloric acid as the hydrolysing agent. By this means, a considerable increase in yield is obtained due, it is believed, to reduction in dehydration of the 17-hydroxy group.

The hydrolysis is conveniently effected at room temperature by allowing the reaction medium to stand for a sufficient time to effect substantial hydrolysis of the semicarbazone linkages. After hydrolysis is substantially complete the medium is conveniently caused to separate into two phases by the addition of a water-soluble salt. We have found that ammonium sulphate is very effective for this purpose, but other salts, e.g. ammonium chloride may also be used. The salt should preferably be added in such an amount as to effect substantially complete separation which may readily be determined by preliminary experiment. Where ammonium sulphate is used a convenient quantity will in general be from 25–50% by weight of the amount of water present.

The organic phase recovered is then washed (a salt being added to the washing solutions to prevent substantial up-take of water) and the steroid recovered by suitable means such as distillation.

The yield of steroid may be improved by extracting the residual aqueous phase with tetrahydrofuran and recovering further steroid therefrom after suitable washing.

In order that the invention may be well understood the following examples are given by way of illustration only:

Example 1

4:5α-dihydrocortisol-3:20-bis-semicarbazone (11.5 g.) was added to a mixture of tetrahydrofuran (400 ml.) and 4.5 N-sulphuric acid (480 ml.) and stirred for 0.5 hour. Ammonium sulpate (200 g.) was added and the mixture stirred and the tetrahydrofuran layer separated. The aqueous layer was twice re-extracted with tetrahydrofuran (200 ml. then 100 ml.). The tetrahydrofuran extracts were washed in turn first with 2 N-sulphuric acid (100 ml.) containing ammonium sulphate (50 g.) then with 8% sodium bicarbonate solution (100 ml.) containing ammonium sulphate (25 g.). The washed tetra hydrofuran extracts were dried over anhydrous sodium sulphate and evaporated to dryness yielding crude 4:5α-dihydrocortisol (8.78 g.).

The crude 4:5α-dihydrocortisol (8.78 g.) was treated with acetic anhydride (20 ml.) and pyridine (20 ml.) and heated on a steam bath for 0.5 hour. Excess acetic anhydride and pyridine were removed by distillation under high vacuum and the residue recrystallised from ethyl acetate (about 100 ml.) with charcoal treatment.

Yield of 4:5α-dihydrocortisol acetate:

1st crop: 7.18 g., M.P. 222–225° C., $[\alpha]_D = +75.2°$ (1% $CHCl_3$)

2nd crop: 0.89 g., M.P. 219–223° C., $[\alpha]_D = +73.8°$ (1% $CHCl_3$)

The combined crops are equivalent to an overall theoretical yield of 80.7%.

*Example 2*

4:5α-dihydrocortisol-3:20-bis-semicarbazone (11.5 g.) was hydrolysed and acetylated as in Example 1 with the exception that an hydrolysis time of 3 hours was operative. The 4:5α-dihydrocortisol acetate yield was:

1st crop: 6.84 g., M.P. 222–224° C., $[\alpha]_D = +74.8°$ (1% $CHCl_3$)

2nd crop: 0.75 g., M. P. 215–220° C., $[\alpha]_D = +71.8°$ (1% $CHCl_3$)

The combined crops are equivalent to an overall yield of 75.9%.

*Example 3*

Hydrocortisone-3:20-bis-semicarbazone (12.5 g.) dissolved in tetrahydrofuran (290 ml.) and water (90 ml.) was stirred at room temperature with a mixture of sulphuric acid (9 N, 215 ml.) and water (175 ml.). Ammonium sulphate (150 g.) was added and the layers were separated. The tetrahydrofuran layer was stirred for 1 hour with sulphuric acid (2 N, 100 ml.) containing ammonium sulphate (50 g.), and was then washed with saturated sodium bicarbonate solution (100 ml.) containing ammonium sulphate (50 g.). The original layer was stirred for 1 hour with tetrahydrofuran (100 ml.), which was used to re-extract the acid and bicarbonate washes.

The combined tetrahydrofuran solution was dried over sodium sulphate, and the product was isolated by evaporation to dryness and treatment of the residue with ether to give hydrocortisone alcohol $$E_{1cm.}^{1\%} = 375, [\alpha]_D^{20} = +171°$$

*Example 4*

Cortisone acetate-3:20-bis-semicarbazone (13 g.) was dissolved in tetrahydrofuran (400 ml.) and water (200 ml.). Sulphuric acid (9 N, 215 ml.) was added and the solution was stirred at room temperature for 25 minutes. A crystalline solid separated during this period and was collected by filtration.

Wt. 2 g., $E_{1cm.}^{1\%} = 369, [\alpha]_D^{20} = +214°$

Paper chromatography indicated that this material was cortisone acetate containing a trace of the 21-alcohol.

The filtrate was stirred with ammonium sulphate (100 g.) and the tetrahydrofuran layer was separated. The solvent layer was washed with sulphuric acid (2 N, 100 ml.) containing ammonium sulphate (50 g.), then with saturated sodium bicarbonate solution (100 ml.) containing ammonium sulphate (50 g.), the aqueous layers being re-extracted with tetrahydrofuran (75 ml.).

The combined tetrahydrofuran solution was dried over sodium sulphate and the product was isolated by evaporation and treatment of the residue with ether to give cortisone acetate (5.1 g.)

$$E_{1cm.}^{1\%} = 332, [\alpha]_D^{20} = +229°$$

*Example 5*

The procedures of Example 1 were repeated using in place of sulphuric acid, 6 N-phosphoric acid. The final total yield of 4:5α-dihydrocortisol acetate was 78.7%.

*Example 6*

The procedures of Example 1 were repeated using in place of sulphuric acid, 2 N-hydrochloric acid. The hydrolysis time was 1 hour. The total yield of 4:5α-dihydrocortisol acetate was 73.5%.

*Example 7*

Prednisolone - 3:20 - bis-semicarbazone (1.0 g.) was added to a mixture of tetrahydrofuran (30 ml.) and 5 N sulphuric acid (30 ml.) and stirred for 0.5 hour at room temperature. Ammonium sulphate (8 g.) was added and the mixture stirred and the tetrahydrofuran layer separated. The aqueous layer was re-extracted with tetrahydrofuran (10 ml.). The tetrahydrofuran extracts were washed in turn first with 2 N sulphuric acid (10 ml.) containing ammonium sulphate (5 g.) then with 8% sodium bicarbonate solution (10 ml.) containing ammonium sulphate (5 g.). The washed tetrahydrofuran extracts were evaporated under reduced pressure to about 3 ml. and water (10 ml.) added. The precipitated solid was filtered off, washed with water (3 ml.) and dried, yielding crude prednisolone (0.08 g.).

We claim:

1. A process for the acid hydrolysis of a steroid bis-semicarbazone selected from the group consisting of a bis-semicarbazone of a 3:20-diketosteroid of the pregnane series and a bis-semicarbazone of a 3:20-diketosteroid of the allopregnane series, comprising contacting said semicarbazone with a strong mineral acid in a homogeneous liquid medium consisting of aqueous tetrahydrofuran to hydrolyze the semicarbazone linkages; adding a water-soluble salt to said medium to effect separation thereof into an organic phase and an aqueous phase; separating said organic phase from said aqueous phase; and recovering the hydrolyzed steroid from said organic phase.

2. The process of claim 1 in which said hydrolyzed steroid is recovered from the organic phase by distilling off the tetrahydrofuran.

3. The process of claim 1 in which said bis-semicarbazone is the 3:20-bis-semicarbazone of prednisolone.

4. The process of claim 1 in which said bis-semicarbazone is the 3:20-bis-semicarbazone of prednisolone-21-acetate.

5. The process of claim 1 in which said bis-semicarbazone is the 3:20-bis-semicarbazone of cortisol.

6. The process of claim 1 in which said bis-semicarbazone is the 3:20-bis-semicarbazone of cortisol 21-acetate.

7. The process of claim 1 in which said bis-semicarbazone is the 3:20-bis-semicarbazone of 4:5α-dihydrocortisol.

8. The process of claim 1 in which said bis-semicarbazone is the 3:20-bis-semicarbazone of 4:5α-dihydrocortisol 21-acetate.

9. The process of claim 1 in which said bis-semicarbazone is the 3:20-bis-semicarbazone of 4:5β-dihydrocortisol.

10. The process of claim 1 in which said bis-semicarbazone is the 3:20-bis-semicarbazone of 4:5β-dihydrocortisol 21-acetate.

11. The process of claim 1 in which said strong mineral acid is sulfuric acid.

12. The process of claim 11 in which said water-soluble salt is ammonium sulfate.

13. The process of claim 12 in which the ammonium sulfate added is from 25–50% by weight of the water present in said medium.

References Cited in the file of this patent

UNITED STATES PATENTS 2,530,334   Kapp et al. _____ Nov. 14, 1950
2,781,367   Day _____ Feb. 12, 1957